Patented Jan. 26, 1954

2,667,483

UNITED STATES PATENT OFFICE 2,667,483

PURIFICATION OF LACTAMS

Rudolph N. G. Zeegers, Geleen, Netherlands, assignor to De Directie van de Staatsmijnen in Limburg, Heerlen, Netherlands No Drawing. Application January 7, 1952, Serial No. 265,361

Claims priority, application Netherlands January 17, 1951

3 Claims. (Cl. 260—239.3)

The present invention relates to the purification of lactams and is particularly concerned with the purification of lactams recovered from waste polyamides.

One of the important ways of making polyamides which are suitable for the production of fibres, filaments and like objects, involves the polymerization of lactams, particularly caprolactam and the homologues thereof. As compared to other known procedures for producing polyamides, polymerization of lactams, and the manufacture of desired objects from the resulting polyamides, offer the advantage that the lactam employed as the starting material can be recovered from the polyamide waste in a very simple manner. In other words, the polyamide obtained as waste in the processing is not worthless, but may instead be utilized for the recovery of the lactam originally employed. The recovered lactam may then be reprocessed, if this is desired, for the production of polyamide or may be employed in some other manner.

In order to recover the lactam from the polyamide waste material, it is simply necessary to heat the material in the presence of substances having an alkaline reaction, for example, sodium hydroxide, during which treatment depolymerization of the polyamide takes place with formation of the lactam. However, it has now been found that the lactam so recovered contains impurities which cannot be removed in customary manner by distillation. These impurities have an unfavorable effect upon polymerization with the result that polymerization products ultimately obtained possess an undesirable dark color and inferior mechanical properties.

The principal object of the present invention is to provide improved procedures for purifying lactams, particularly those obtainable from polyamide waste materials. Another object of the invention is to provide procedures for purifying lactams, whereby the difficulties and disadvantages in prior purification techniques, outlined above, are virtually eliminated. Still another object of the invention is to obtain purified lactams from polyamide wastes which are particularly suitable for re-use in the production of polyamides. A more specific object of the invention is the provision of improved techniques for purifying caprolactam and the homologues thereof derived from polyamide waste.

Still further objects of the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The foregoing objects are accomplished according to the present invention by heating a solution of the impure lactam in oleum to a temperature of between about 120° to 190° C., neutralizing the heated solution by addition thereto of an aqueous solution of an alkali, whereupon an aqueous layer and an oil layer are formed, separating the aqueous layer from the oil layer and, thereafter recovering the lactam from the oil layer.

The unique results obtained in accordance with the invention appear to be due, at least to a large extent, to the heating of the solution of the lactam in oleum within the designated temperature range. By virtue of this heating, it has been found that a portion of the impurities in the lactam are converted into water-soluble products which, after neutralization, are dissolved in the aqueous layer and removed therewith. The remaining impurities are converted into non-volatile compounds which remain in the oil layer as a residue during the recovery of the lactam by distillation under reduced pressure.

The manner in which the present procedures are utilized and the operational details thereof can be more fully comprehended by reference to the following illustrative example of actual operations in accordance with the invention.

Example

Waste polyamide, obtained by polymerization of caprolactam, is depolymerized in a distilling apparatus at a reduced pressure by heating it to 350° C. after addition of a small amount of sodium hydroxide of about 3% by weight with respect to the amount of polyamide. The impure caprolactam distilling over from the reaction mixture is condensed and 100 parts by weight of this caprolactam are dissolved in 100 parts by weight of oleum containing 5% by weight of free sulfur trioxide. The solution is then heated to 150° C. and kept at this temperature for 10 minutes.

Subsequently, the solution is neutralized with a 30% sodium hydroxide solution in water by which treatment two layers are formed. The aqueous layer is removed, the oil layer being distilled at a reduced pressure. 90 parts by weight of purified caprolactam were obtained.

The polyamide obtained by polymerization of the thus obtained purified caprolactam yields products, such as fibres, bars, plates and other objects which are permanently colorless and show good mechanical properties. If, on the other hand, the impure caprolactam is purified in conventional manner, e. g., by repeated distillation after addition of sodium hydroxide or phosphoric acid, products are obtained which, although initially colorless, assume a brown coloration after a few weeks. Moreover, the yield is only about 70% of the amount which is obtained by the process according to the invention.

The procedures of the invention are generally applicable to the purification of lactams, in particular caprolactam, and the homologues thereof, such as butyrolactam and valerolactam, especially, when these products have been obtained by the depolymerization of waste polyamide. However, lactams obtained in other ways, for example, by synthesis, may also be purified in accordance with the techniques herein described.

The amount of oleum employed for dissolution of the lactam, and the free sulfur trioxide content thereof, can be widely varied and depend primarily on the quantity of impurities contained in the lactam to be purified. As a general rule, lactams derived from polyamide wastes contain only a small percentage of impurities and these may be removed using oleum of a low concentration containing at least 2% free sulfur trioxide. In preferred operations, from 0.85 to 2.5 parts by weight of oleum per part of impure lactam are employed and particularly good results are obtained by dissolving the impure lactam in about an equal quantity by weight of oleum with a free sulfur trioxide content of 3–5%. However, larger quantities of oleum with an even higher free sulfur trioxide content may also be employed although no particular advantage is gained thereby.

The length of time the lactam solution is heated within the designated temperature range may be widely varied and depends primarily upon the temperature employed. In general, when working at the higher temperatures of the range, e. g., 185° C., the heating may be stopped just as soon as the desired temperature has been reached, although the heating may be prolonged if desired. Preferably, however, temperatures between about 120° C. and 150° C. are employed, the heating within this preferred range being desirably continued for a few minutes, generally not longer than 10–15 minutes.

The neutralization of the heated lactam solution can be effected with an aqueous solution of any alkali which does not react with the lactam being purified or give a reaction product with the oleum which will react with the lactam. Preferably, the alkali employed is one which gives a reaction product with oleum which is either insoluble in the lactam or at least does not decompose upon distillation of the lactam, if soluble therein. As example of suitable alkalis, there may be mentioned the alkali metal hydroxides, alkaline earth hydroxides, ammonium hydroxide, and alkaline reacting salts, such as the alkali metal salts of weak acids, typical of which are sodium carbonate and sodium acetate. Sufficient of the alkali should be employed to neutralize the lactam solution.

The concentration of the alkali solution is not critical and can be widely varied. Generally, the concentration employed will be dependent upon a number of other operating factors, such as the nature and quality of the impurities and the alkali employed. Optimum quantities and concentrations of the alkali can be readily ascertained from the other prevailing operating conditions but, generally speaking, should be sufficient to provide an aqueous layer in which all water-soluble impurities formed during the heating step may be dissolved. As typically suitable alkali solutions, there may be mentioned those containing from 10 to 25% by weight of ammonia or sodium hydroxide solutions containing from 10 to 40% by weight of sodium hydroxide but other concentrations of these or other alkalis may be used with equally satisfactory results.

As will be appreciated from the foregoing, the present invention makes possible significantly better results than are obtainable with the conventional lactam purification procedures, e. g., distillation of the impure lactam with or without the addition of purifying agents, such as sodium hydroxide, phosphoric acid and the like. For instance, polyamides obtained from lactams derived from waste polyamide and purified in accordance with the present invention are, in contrast to polyamides derived from these lactams when purified in conventional manner, very stable, do not show a tendency to discolor and possess excellent mechanical properties.

It will be understood that various changes and modifications of the invention, as above described, may be made without in any way departing from the spirit and scope thereof, as defined in the appended claims.

I claim:

1. A process for recovering purified caprolactam from polyamide waste material which comprises depolymerizing the polyamide in said waste material whereupon caprolactam is obtained, dissolving the thus obtained impure caprolactam in from 0.85 to 2.5 parts by weight of oleum per part of lactam, heating the resulting solution to a temperature of between about 120° to 190° C., thereafter neutralizing said solution by addition thereto of an aqueous alkaline solution whereupon a water layer and an oil layer containing the caprolactam are formed, separating said oil layer from said water layer and thereafter distilling purified caprolactam from said oil layer.

2. The process of claim 1, wherein said polyamide is depolymerized by distillation of the waste material with dilute sodium hydroxide.

3. Process for purifying caprolactams derived from polyamide waste material by depolymerization of the polyamide in said waste material which comprises dissolving the impure lactam in an equal quantity by weight of oleum having a free sulfur trioxide content of from about 3 to 5% by weight, heating the resulting solution to a temperature of between about 120° to 150° C. for a period of up to about 15 minutes, thereafter neutralizing said solution by addition thereto of an aqueous solution of an alkali metal hydroxide whereupon a water layer and an oil layer containing the lactam are formed separating said oil layer from said water layer and thereafter distilling the purified lactam under reduced pressure from said oil layer.

RUDOLPH N. G. ZEEGERS.

References Cited in the file of this patent

UNITED STATES PATENTS

| Number | Name | Date |
| --- | --- | --- |
| 2,081,475 | Carr | May 25, 1937 |
| 2,351,381 | Wiest | June 13, 1944 |
| 2,541,874 | Kahr | Feb. 13, 1951 |
| 2,573,374 | Wichterle | Oct. 30, 1951 |

FOREIGN PATENTS

| Number | Country | Date |
| --- | --- | --- |
| 407,204 | Italy | Sept. 21, 1944 |
| 992,052 | France | June 27, 1951 |